Jan. 24, 1967    F. G. FISHER    3,300,393
SALINE SPRAY DISTILLATION WITHIN ROTATING SOLAR HEATER
Filed July 25, 1962    2 Sheets-Sheet 1
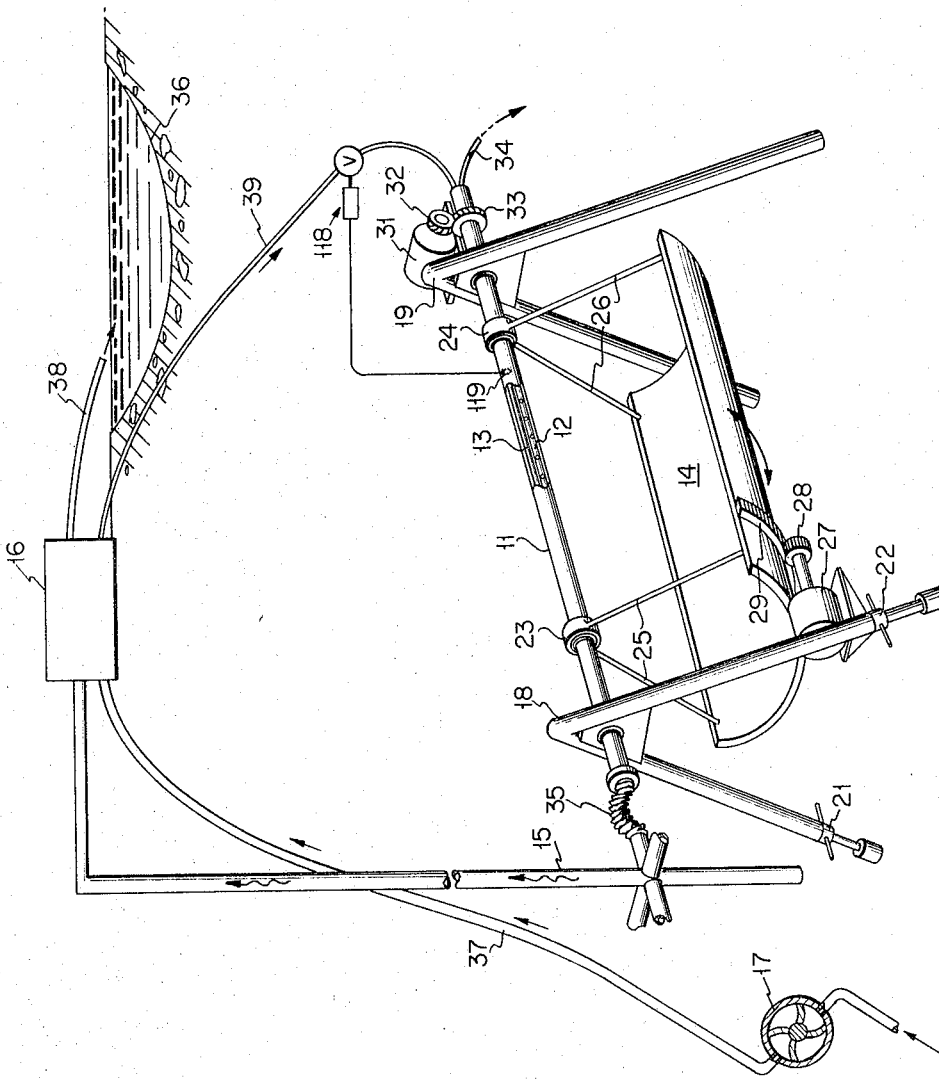
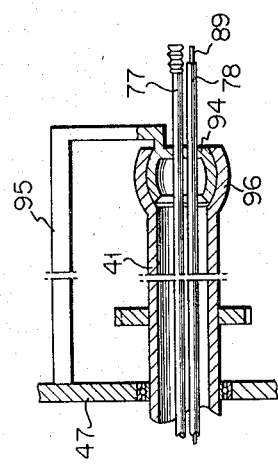
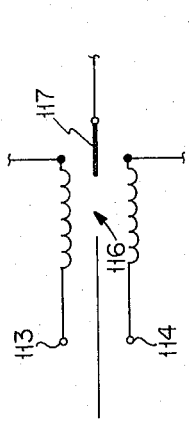
INVENTOR.
FRANKLIN G. FISHER
By
*Robert B. Crouch*
ATTORNEY Jan. 24, 1967     F. G. FISHER     3,300,393
SALINE SPRAY DISTILLATION WITHIN ROTATING SOLAR HEATER
Filed July 25, 1962     2 Sheets-Sheet 2
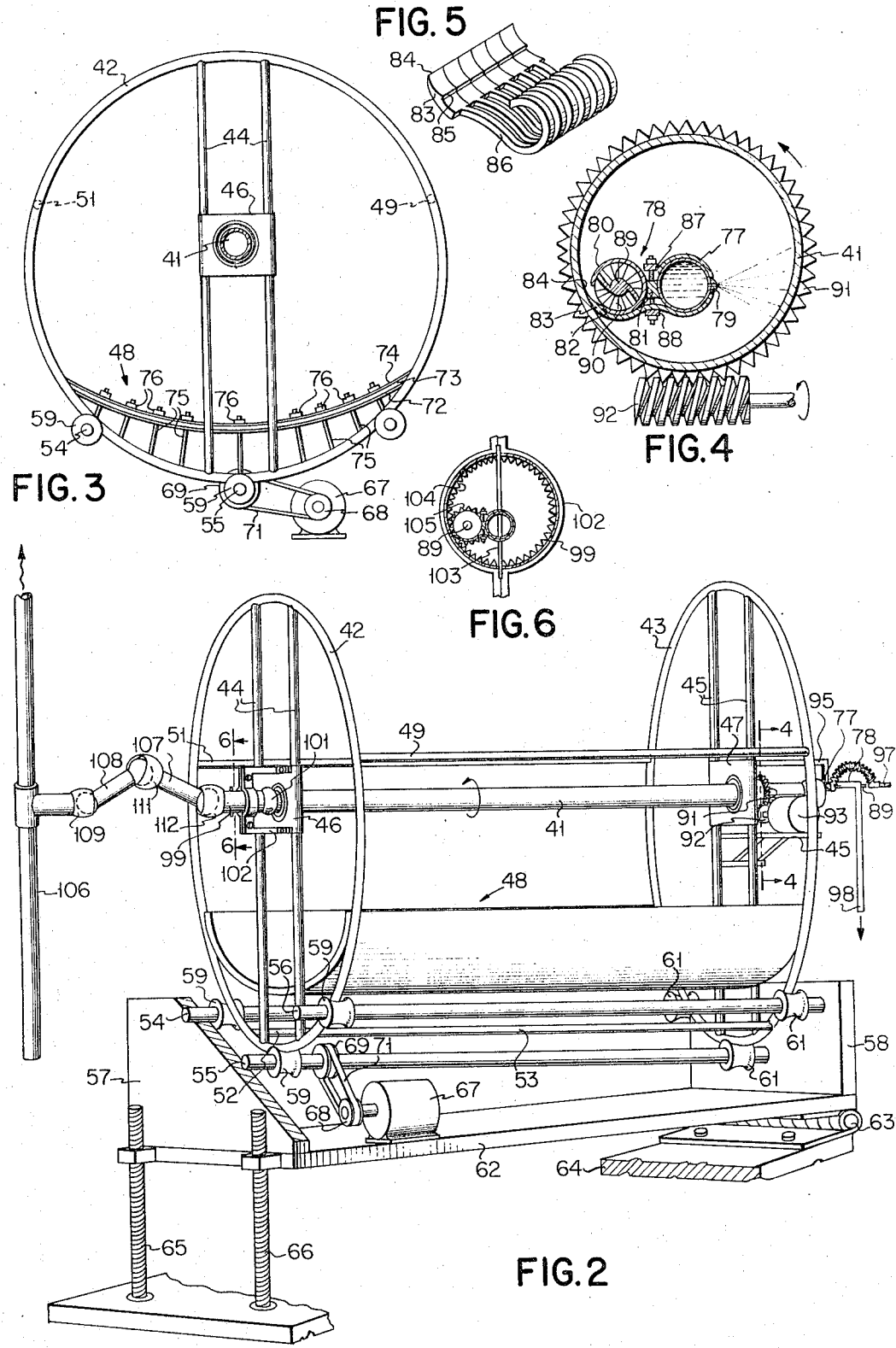

3,300,393
SALINE SPRAY DISTILLATION WITHIN ROTATING SOLAR HEATER
Franklin G. Fisher, 5492 Rudy Drive, San Jose, Calif. 95124
Filed July 25, 1962, Ser. No. 212,299
5 Claims. (Cl. 203—10)

The present invention relates to a method and apparatus for desalination of sea water and more particularly to a method and apparatus for the flash evaporation of sea water with solar energy.

The desalination of sea water has been attempted in the past by a variety of diverse equipment and methods. Illustrative of the various desalination techniques employed are: freezing of an immiscible refrigerant by evaporation followed by separation of the ice crystals from the brine; evaporation in falling-film, long-tube, multiple effect evaporators or in multistage flash evaporators; distillation in centrifugal recompression stills or in solar radiation distillation basins; and demineralization by ion exchange, reverse osmosis through semi-permeable membranes, or by electrochemical or electrodialysis processes. While these various techniques have differed widely in technologies employed, results obtained, degree of practicality, etc., they have all had one characteristic in common in that none has been completely satisfactory from an economic standpoint. Each of the techniques explored to date has turned out to be too expensive for widespread use in large capacity operation.

The object of the present invention is to provide a practical and economical method and apparatus for desalination of sea water with solar energy.

The above object is realized in the present invention by provision of a method and apparatus for the flash evaporation of sea water with solar energy. The method of the present invention includes the steps of focusing the sun's rays on to a closed chamber, introducing the sea water into contact with the heated surface causing flash evaporation; continuously removing the salts and minerals from the heated surface; and leading steam from the chamber. This method is carried out in the present invention by provision of an elongated, cylindrical evaporation chamber mounted for rotation about its longitudinal axis, and a reflector for focusing the sun's rays against the outer surface of the chamber over its full length. Means is provided for spraying the sea water against the interior surface of the chamber along with other means for removing the salts and minerals from the interior surface and transporting them to one end of the chamber. Means is provided for rotating the evaporation chamber along with other means for adjusting the reflector to follow the apparent path of the sun. The evaporated water is led off from the chamber in the form of steam and can either be condensed directly or can be conducted to elevated heights in its vaporous form before condensation occurs.

The foregoing and other objects, features and advantages of the invention will be apparent from the following more particular description of a preferred embodiment of the invention, as illustrated in the accompanying drawings.

FIGURE 1 is a perspective view showing the present invention in schematic form;
FIGURE 2 is a perspective view of a preferred embodiment of the apparatus of the present invention;
FIGURE 3 is an end elevation view of the apparatus of FIGURE 2;
FIGURE 4 is a section at an enlarged scale taken along line 4—4 of FIGURE 2;
FIGURE 5 is a perspective view of the scraper teeth of FIGURE 4;
FIGURE 6 is a section taken along line 6—6 of FIGURE 2;
FIGURE 7 is a fragmentary elevation view of the lower end of the evaporation chamber of FIGURE 2; and
FIGURE 8 is a diagrammatic showing of a light responsive motor control.

Referring to FIG. 1 of the drawings the apparatus of the present invention is illustrated in schematic form as including an elongated, cylindrical evaporation chamber 11 surrounding a spray tube 12 and a scraper 13, a cylindrical parabolic reflector 14 suspended below the evaporation chamber, a steam riser 15, a condenser 16 and a sea water supply means, such as a pump 17. The evaporation chamber is rotatably mounted in spaced supports 18 and 19, one of which is vertically adjustable, such as by screw jacks 21 and 22. The reflector 14 is supported from the evaporation chamber by bearings 23, 24 and struts 25, 26, so the chamber will lie along the focal point of the reflector. A motor 27 is mounted on support 18 and is drivingly connected to the reflector, such as by a spur gear 28 and a rack 29, to position the reflector about the evaporation chamber. The adjustable support allows the evaporation chamber and the reflector to be tilted as a unit to face the sun, while the pivotal mounting of the reflector on the chamber permits the reflector to be moved independently to keep the sun's rays focused on the lower surface of the evaporation chamber as the earth rotates.

The spray tube 12 and the scraper 13 extend the full length of the evaporation chamber and are supported in fixed positions within the chamber. The spray tube is provided with a series of orifices for spraying the sea water against the interior surface of the evaporation chamber while the scraper is provided with a sharp edge which bears against the interior surface of the chamber. A motor 31 is mounted on support 19 and is drivingly connected to the evaporation chamber, through a worm gear 32 and a ring gear 33, to slowly rotate the chamber in a counterclockwise direction. The sun's rays focused against the lower portion of the evaporation chamber by the reflector continuously heat the wall of the chamber. As the chamber is slowly rotated by motor 31 the heated segment of the chamber is brought into line with the orifices of the spray tube and it is bathed with spray. The elevated temperature of the chamber wall causes flash evaporation of the water in the spray, leaving the salts deposited in a putty-like sludge on the interior surface of the chamber. Continued rotation of the chamber causes the sludge to be removed by the sharp edge of the scraper. The sludge may then be washed or carried along the scraper to a discharge outlet 34 at the lower end of the evaporation chamber by any suitable means (not shown). The steam formed by the flash evaporation of the sea water rises to the higher end of the evaporation chamber where it is led off through a flexible conduit 35 to the steam riser 15. The steam rises by gravity in riser 15 until it reaches the level of the fresh water storage facility 36, where it is led into the condenser 16. Sea water is supplied through a pipe 37 to the condenser where it is circulated to cool the steam and condense the moisture which then flows through pipe 38 to the storage facility 36. The sea water, which is pre-heated by the heat of condensation of the steam, is then delivered through pipe 39 to the spray tube 12.

In FIG. 2 a preferred embodiment of the apparatus of the present invention is illustrated as including an elongated cylindrical evaporation chamber 41 supported at the center of a pair of circular rings 42 and 43. Each ring is provided with a pair of parallel braces 44 and 45 which carry bearing plates 46 and 47. The evaporation chamber is journalled in the respective bearing plates for rotation about its longitudinal axis. A cylindrical parabolic reflector 48 is supported in position below the evaporation chamber by the rings 42 and 43. The rings are interconnected by a plurality of cross braces 49, 51, 52 and 53 to form a rigid structure. The rings are supported by a plurality of shafts 54, 55, 56 which are journalled in spaced end supports 57 and 58. Each shaft carries a pair of relatively soft rubber rollers 59 and 61 spaced apart to bear against the rings. Each roller is provided with a concave external surface to provide both vertical and lateral support to the rings. The end supports 57 and 58 are mounted on a platform 62, one end of which is pivotally connected (as by a hinge 63) to a base 64. The opposite end of the platform is supported above the base for vertical adjustment by jacks 65 and 66. A reversible motor 67 is mounted on platform 62 and is drivingly connected to shaft 55 by pulleys 68, 69 and belt 71. The remaining shafts 54 and 56 may be similarly connected to shaft 55 or motor 67 if desired.

Referring to FIG. 3 of the drawings the reflector 48 is illustrated as including a backing sheet 72 of light, strong material, such as plywood, pressed board, etc. A polished reflecting surface 73 of specular aluminum, chrome plated steel, etc. is positioned on top of the backing sheet and clamped in place by an edge strip 74. A number of threaded studs 75 are secured to the rings and extend through the backing sheet and the edge strip. The reflector is held in place by threaded nuts 76 received on the studs. The nuts 76 provide a simple means of adjusting the reflector to focus onto the evaporation chamber 41.

As illustrated in FIG. 4 a spray tube 77 and a scraper 78 are positioned within the evaporation chamber. The spray tube is provided with lateral orifices 79 for spraying sea water against the internal surface of the chamber throughout its effective length. The scraper includes a tubular housing 80 which may be joined to the spray tube by a web 81 for rigidity and for ease in mounting. The housing 80 is provided with a longitudinal opening extending the effective length of the chamber and defined by a laterally projecting lip 82. Spring scraper teeth 83 (FIG. 5) are mounted on lip 82 and bear against the interior surface of the chamber under spring pressure. Each scraper tooth includes a convergent scraping edge 84, a mounting slot 85 adapted to receive lip 82, and a narrow spring finger 86 adapted to pass around the spray tube between the orifices. The spring fingers are clamped in position between upper and lower bars 87 and 88 which are connected by any suitable means, such as bolts, screws, etc. A shaft 89 with a radially extending screw conveyer blade 90 is positioned within housing 80 and extends the full length of the housing. A ring gear 91 is mounted on the periphery of the chamber 41 and engages a worm gear 92 on a motor 93 which is mounted on braces 45 of ring 43.

The lower end of evaporation chamber 41 is closed, as shown in FIG. 7, with a cap 94 which is supported from bearing plate 47 by a bracket 95. The cap is provided with inturned edges which are received within a bell 96 on the end of chamber 41 to form a water tight joint between the fixed cap and the rotating chamber. The spray tube 77 and the scraper 78 extend through the cap and are connected to a sea water supply pipe 97 and a sludge discharge pipe 98, respectively. The sludge conveyer shaft 89 extends through and is journalled in the side of the sludge discharge pipe as shown.

The upper end of the evaporation chamber is connected to one end of a short conduit 99 through a bell joint 101, as shown in FIG. 2. Conduit 99 is supported from bearing plate 46 by a bracket 102 similar to bracket 95. As shown in FIG. 6, the upper ends of the spray tube and the scraper are supported within conduit 99, as by a rod 103 secured to the spray tube. A ring gear 104 is secured to the interior surface of the evaporation chamber just inside bell joint 101 and engages a spur gear 105 secured to shaft 89. The opposite end of conduit 99 is connected to a steam riser 106 through an articulated conduit linkage consisting of short lengths of conduits 107 and 108 interconnected by bell joints 109, 111 and 112.

In the operation of the embodiment of FIG. 2, the platform 62 is tilted by jacks 65 and 66 until reflector 48 faces squarely into the sun. Motor 67 is then energized to rotate shaft 55 and rings 42 and 43 to focus the sun's rays onto the under surface of the evaporation chamber. Sea water is supplied to spray tube 77 from which it is sprayed against the inner surface of the chamber. The chamber is slowly rotated by motor 93 to constantly move the heated portion of the chamber wall into the spray zone to effect flash evaporation of the water in the spray. The salts are deposited in a sludge on the inner surface of the chamber and, as the chamber rotates, are removed by the scraper teeth 83. As the chamber rotates the sludge is fed through the longitudinal slot defined by lip 82 into housing 80. As the sludge passes through the slot it is picked up by the screw coneveyer blade 90. The conveyer blade is rotated by shaft 89 which is driven by the evaporation chamber through ring gear 104 and spur gear 105. Due to the relative sizes of the ring gear and the spur gear the shaft 89 is rotated at a faster rate than the chamber to prevent clogging of the conveyer. The sludge is carried to the lower end of chamber where it is dropped off the conveyer screw into discharge pipe 98. Steam is led through conduits 99, 107 and 108 to the steam riser 106 which transports it to a condenser (not shown) as discussed in connection with FIG. 1.

Motor 93 is operated continuously while the device of FIG. 2 is functioning. Motor 67 may be operated intermittently by a timer or can be automatically operated by a suitable light responsive control, such as shown in FIG. 8. In the control of FIG. 8 a pair of solar cells 113 and 114 are separated by a vertical screen 115. Each solar cell is connected to one winding of a balanced relay 116. As long as both cells are in sunlight the windings of the relay are balanced and a switch 117 remains open. When the shadow from the screen falls on one cell, the power supplied to the associated winding drops and the switch is picked by the remaining winding to drive motor 67 until both solar cells are again in sunlight and the windings of the relay are again balanced. The vertical positioning of platform 62 may be accomplished by operating jacks 65 and 66 by hand, or it can be done automatically by means of a motor and a control such as shown in FIG. 8.

The salts deposited on the interior surface of the evaporation chamber are kept from encrusting and solidifying by the moist atmosphere within the chamber. The temperature within the chamber is controlled and kept constant by controlling the rate at which the sea water is sprayed into the chamber. This can be accomplished (as shown in FIG. 1) by means of a servo operated valve 118 in supply pipe 39 which is controlled by a thermocouple 119 mounted in the chamber. The temperature of the chamber wall can be increased and held approximately constant by attaching wind screens which extend vertically on each side of the chamber between the longitudinal edges of the reflector and braces 49 and 51 and longitudinally between the rings.

The evaporation chamber, spray tube and scraper should be made of stainless steel or other suitable corrosion resistant materials. In addition, the exterior surface of the evaporation chamber should be coated with carbon or other black, heat-absorbent material so that the sun's rays will be absorbed instead of being reflected. While the present invention has been discussed only in terms of sea water, it is understood that is equally applicable to the evaporation of brackish water also.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A method of desalinating sea water comprising the steps of:
   focusing the sun's rays directly against the exterior surface of a longitudinal segment of an elongated closed chamber;
   rotating the chamber continuously;
   spraying sea water continuously against the interior surface of the longitudinal segment of the chamber;
   leading steam from the chamber;
   continuously removing salts from the interior surface of the chamber and transporting them to an end of the chamber and discharging them from the chamber.

2. Apparatus for desalinating sea water by flash evaporation with solar energy, comprising:
   an elongated cylindrical chamber mounted for rotation about its longitudinal axis;
   a cylindrical parabolic reflector mounted adjacent the chamber for focusing the sun's rays directly onto the exterior surface of a longitudinal segment of the chamber;
   means for moving the reflector about the axis of the chamber;
   a spray tube fixed within the chamber and extending the full length thereof to spray sea water against the interior surface of the longitudinal segment of the chamber;
   a scraper mounted within the chamber and having constant contact with the internal surface thereof for removing the salts therefrom;
   a conveyer mounted adjacent the scraper for continuously transporting the salts to one end of the chamber and discharging them therefrom.

3. Apparatus for desalinating sea water by flash evaporation with solar energy, comprising:
   an elongated cylindrical chamber journalled for rotation at the centers of a pair of spaced parallel rings;
   a cylindrical parabolic reflector mounted on the rings below the chamber for focusing the sun's rays directly onto the exterior surface of a longitudinal segment of the chamber;
   means for rotating the rings together to move the reflector about the axis of the chamber;
   a spray tube fixed within the chamber and extending the full length thereof to spray sea water against the interior surface of the longitudinal segment of the chamber;
   a scraper mounted within the chamber and having constant contact with the internal surface thereof for removing the salts therefrom;
   a conveyer mounted adjacent the scraper for continuously transporting the salts to one end of the chamber and discharging them therefrom.

4. Apparatus as defined in claim 3 wherein the scraper includes a series of spring scraper teeth.

5. Apparatus as defined in claim 3 including means for elevating one ring relative to the other ring to maintain the reflector normal with the sun's rays.

References Cited by the Examiner

UNITED STATES PATENTS

| | | | |
|---|---|---|---|
| 980,444 | 1/1911 | Sleeper | 159—11 |
| 1,266,013 | 5/1918 | Gray | 159—4 |
| 1,501,515 | 7/1924 | Testrup | 202—236 |
| 1,918,385 | 7/1933 | Engisch. | |
| 2,023,468 | 12/1935 | Dietrich | 159—11 |
| 2,141,330 | 12/1938 | Abbot. | |
| 2,247,830 | 7/1941 | Abbot | 126—271 |
| 2,735,807 | 2/1956 | Banker | 202—238 |
| 2,803,591 | 8/1957 | Coanda | 202—234 |
| 2,975,107 | 3/1961 | Friedman | 202—234 |

NORMAN YUDKOFF, *Primary Examiner.*

J. B. DONIHEE, M. H. SILVERSTEIN,
*Assistant Examiners.*